(12) United States Patent
Steinberg et al.

(10) Patent No.: US 6,754,427 B2
(45) Date of Patent: Jun. 22, 2004

(54) METHOD AND DEVICE PASSIVELY LOCATING A FIBER STUB IN A GROOVE

(75) Inventors: Dan A. Steinberg, Blacksburg, VA (US); Martin G. Meder, Neenah, WI (US)

(73) Assignee: Shipley Company, L.L.C., Marlborough, MA (US)

( * ) Notice: Subject to any disclaimer, the term of this patent is extended or adjusted under 35 U.S.C. 154(b) by 0 days.

(21) Appl. No.: 10/071,871

(22) Filed: Feb. 8, 2002

(65) Prior Publication Data

US 2003/0007771 A1 Jan. 9, 2003

Related U.S. Application Data

(60) Provisional application No. 60/267,369, filed on Feb. 8, 2001.

(51) Int. Cl.[7] .................................................. G02B 6/00
(52) U.S. Cl. ........................... 385/137; 385/52; 385/91; 385/49
(58) Field of Search .............................. 385/49, 50, 51, 385/52, 65, 83, 89, 90, 91, 137

(56) References Cited

U.S. PATENT DOCUMENTS

| | | | | |
|---|---|---|---|---|
| 4,033,668 A | | 7/1977 | Presby | |
| 5,533,158 A | * | 7/1996 | Han et al. | 385/88 |
| 5,550,088 A | * | 8/1996 | Dautartas et al. | 216/2 |
| 5,581,646 A | | 12/1996 | Tsukamoto et al. | |
| 5,656,507 A | | 8/1997 | Welbourn et al. | |
| 5,717,803 A | * | 2/1998 | Yoneda et al. | 385/89 |
| 5,784,509 A | * | 7/1998 | Yamane et al. | 385/49 |
| 5,793,914 A | | 8/1998 | Sasaki | |
| 5,896,481 A | * | 4/1999 | Beranek et al. | 385/90 |
| 6,017,681 A | | 1/2000 | Tsukamoto et al. | |
| 6,086,776 A | * | 7/2000 | Maynard | 216/24 |
| 6,485,191 B1 | * | 11/2002 | Sato | 385/73 |

* cited by examiner

Primary Examiner—Hermang Sanghavi
Assistant Examiner—Scott A Knauss
(74) Attorney, Agent, or Firm—Jonathan D. Baskin

(57) ABSTRACT

The invention includes fiber optic device, comprising a substrate comprising at least one groove comprising a first surface, a fiber stop a bonding material, and at least one fiber comprising a second surface in the at least one groove, wherein at least one of the first surface and the second surface has a surface energy that increases in the direction of the fiber stop and method for longitudinally locating an optical fiber stub in a groove wherein the fiber stub is pressed against a fiber stop by surface tension.

20 Claims, 4 Drawing Sheets

METHOD AND DEVICE PASSIVELY LOCATING A FIBER STUB IN A GROOVE

RELATED APPLICATIONS

The present application claims the benefit of priority of copending provisional patent application 60/267,369 filed on Feb. 8, 2001 which is hereby incorporated by reference as if set forth in full.

FIELD OF THE INVENTION

The invention relates to fiber optic devices, and methods of making fiber optic devices.

BACKGROUND OF THE INVENTION

In some microoptical assemblies it is necessary to locate a short section (a stub or end, e.g. 0.5–5 mm long) of optical fiber in a groove (e.g. a V-groove). Placing the optical fiber in the groove is a simple matter, but locating the optical fiber longitudinally can be difficult. It would be an advance in the art of microoptical assembly construction to provide a simple method for longitudinally locating an optical fiber stub in a groove such as a V-groove.

SUMMARY OF THE INVENTION

The invention includes fiber optic device, comprising a substrate comprising at least one groove comprising a first surface, a fiber stop a bonding material, and at least one fiber comprising a second surface in the at least one groove, wherein at least one of the first surface and the second surface has a surface energy that increases in the direction of the fiber stop and method for longitudinally locating an optical fiber stub in a groove wherein the fiber stub is pressed against a fiber stop by surface tension.

DETAILED DESCRIPTION

Figure 1:
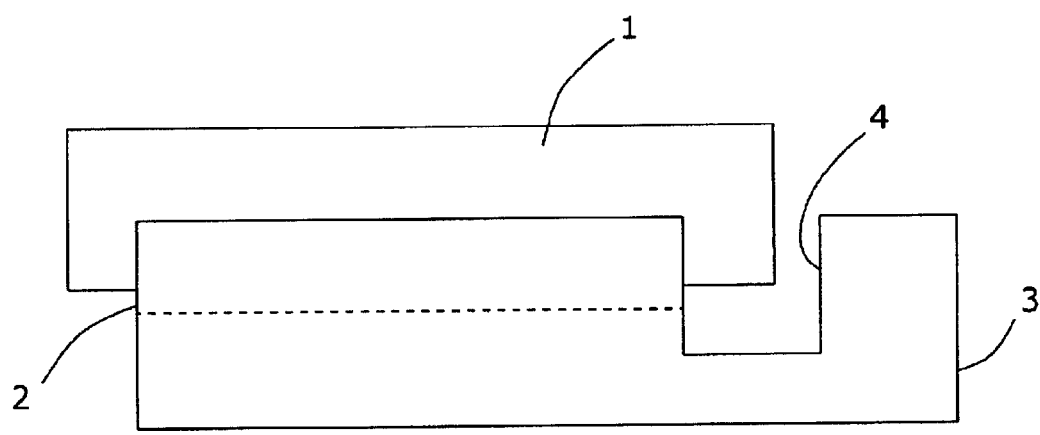
FIG. 1 Shows a side view of an optical fiber in a V-groove and a fiber stop.
Figure 2:
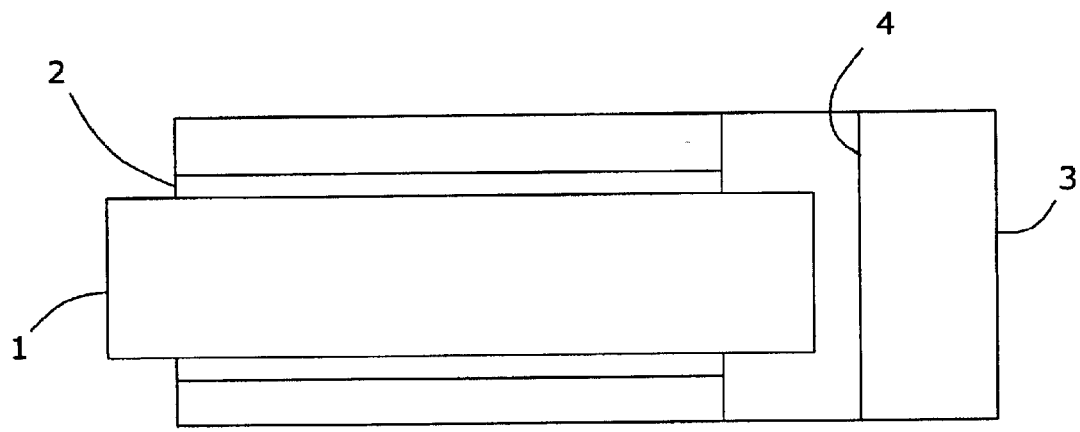
FIG. 2 Shows a top view of an optical fiber in a V-groove and a fiber stop.

In the present invention, an optical fiber 1 is longitudinally located in a V-groove 2 in a substrate 3 by surface tension, as can be seen in FIGS. 1 and 2. A hardenable liquid bonding material e.g. solder, epoxy or the like (not shown), is disposed in the groove 2 with the fiber 1. The fiber 1 may float on the liquid, or the fiber 1 may contact the surfaces of the V-groove 2. Surface tension forces from the liquid pull the fiber 1 in a longitudinal direction. The fiber 1 then butts against a fiber stop 4 such as a vertical sidewall (e.g. from a dicing saw cut). The groove 2 may have wettable and unwettable areas that are shaped to provide surface tension force in a particular direction, such as towards the fiber stop 4. Note that the V-groove 2 can be formed by potassium hydroxide etching of (100) single crystal silicon, as is well known in the art. The etching may be controlled to produce a truncated V-groove, known in the art as a U-groove.

FIGS. 1 and 2 are side and top views respectively of a typical substrate 3 requiring a fiber 1 end (or stub) needing to be butted against the fiber stop 4. Therefore, the fiber 1 needs to be pushed to the right.

Figure 3:
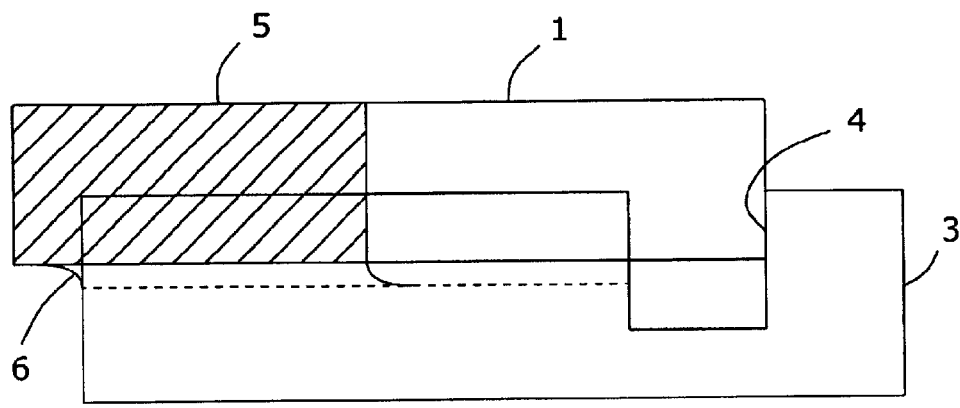
FIG. 3 Shows a partially metallized fiber in a metallized V-groove, being pulled toward a fiber stop by liquid solder surface tension, for one embodiment of the invention.

In a preferred embodiment, the optical fiber and groove are metallized and the liquid is solder. FIG. 3 shows an embodiment of the present invention. The fiber 1 is partially metallized 5. The V-groove 2 is fully metallized. Since the fiber 1 is partially metallized 5, the surface tension in the solder fillet 6 tends to push the fiber 1 against the fiber stop 4, the motion providing greater wetted area wetted by solder, thereby providing longitudinal positioning for the optical fiber 1.

Figure 4:
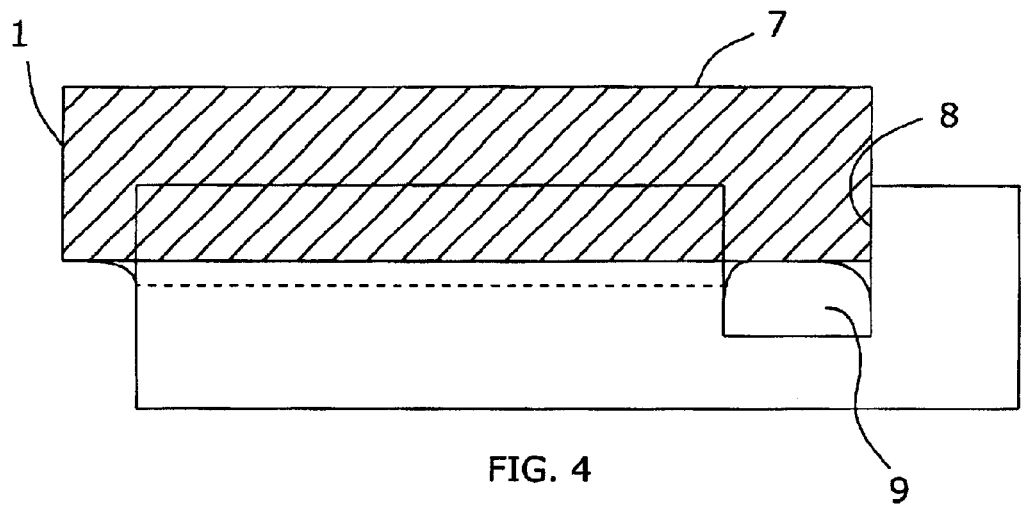
FIG. 4 Shows a metallized fiber in V-groove, being pulled toward a metallized fiber stop by liquid solder surface tension, for one embodiment of the invention.

In another aspect of the present invention, as can be seen in FIG. 4, the entire fiber 1 end (but for the face of the fiber) is metallized 7 about its perimeter, and the fiber stop surface 8 is metallized. The longitudinal force on the fiber 1 is provided mainly by the solder fillet 9 attached to the fiber stop surface 8. The fiber stop surface 8 can be metallized by angled metal deposition or sputtering, for example.

Figure 5:
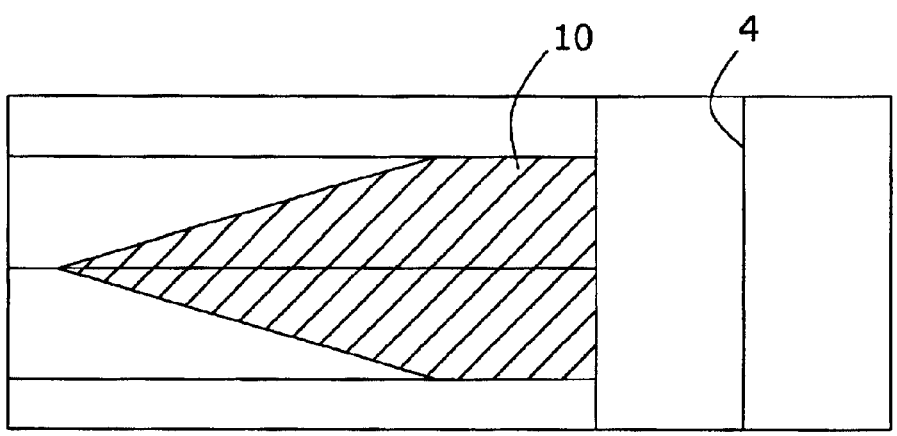
FIGS. 5–7 Show the use of tapered metallization patterns to provide greater wettability toward the direction of the fiber stop, for various embodiments of the invention FIG. 8 Shows that increased wettability toward the fiber stop may be achieved by metallization of the end of a fiber, for yet another embodiment of the invention FIGS. 9–12 Show that tapered metallization patterns in a V-groove may be obtained by etching a dry pit that is deeper than a V-Groove. In this way, once metallized, the metal that deposits in the pit will not contribute to solder wetting of the V-Groove.
Figure 6:
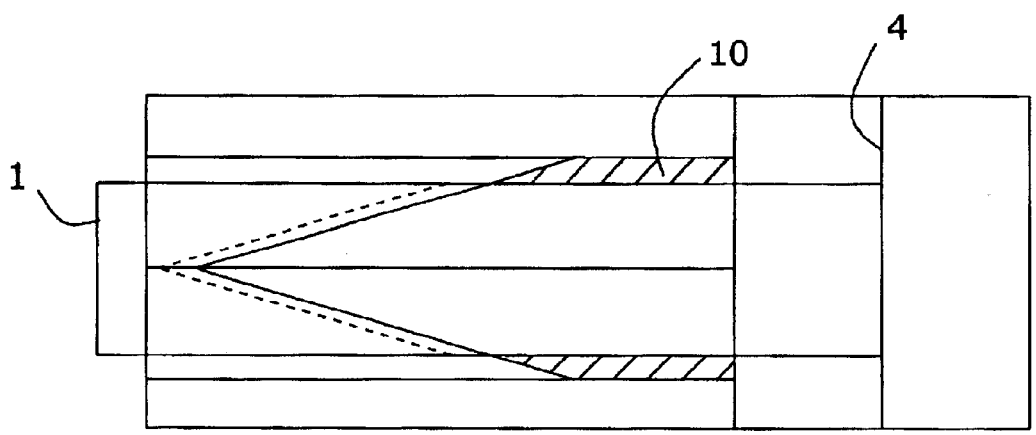
Figure 7:
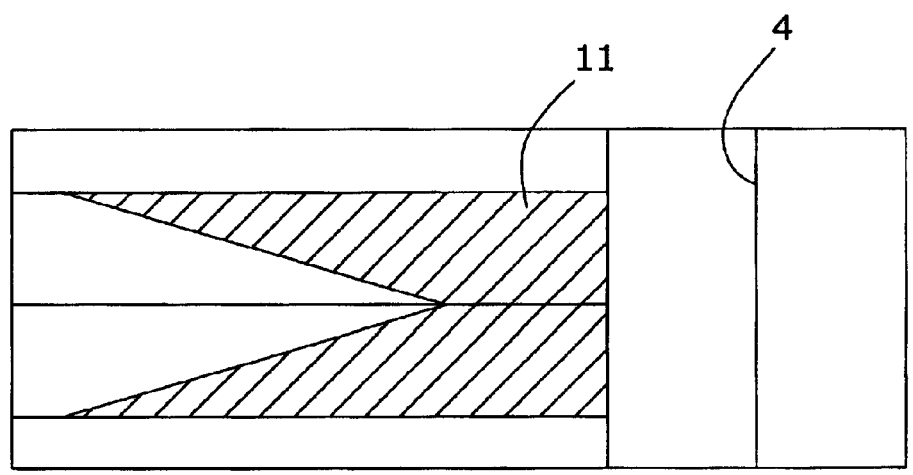

In another aspect of the present invention, the V-groove has a tapered metallization pattern 10, as can be seen in FIGS. 5 and 6. The tapered metallization patterns 10 and creates a net surface tension force that pushes the optical fiber 1 toward the fiber stop 4. There is a net force because the taper shape 10 creates a surface that has greater wettability by the molten solder (not shown), by virtue of greater wetted area, toward the direction of the fiber stop 4. In this embodiment, the entire fiber 1 may be metallized. Other tapered metallization patterns can also be used, such as the tapered metallization pattern 11, seen in FIG. 7.

Figure 8:
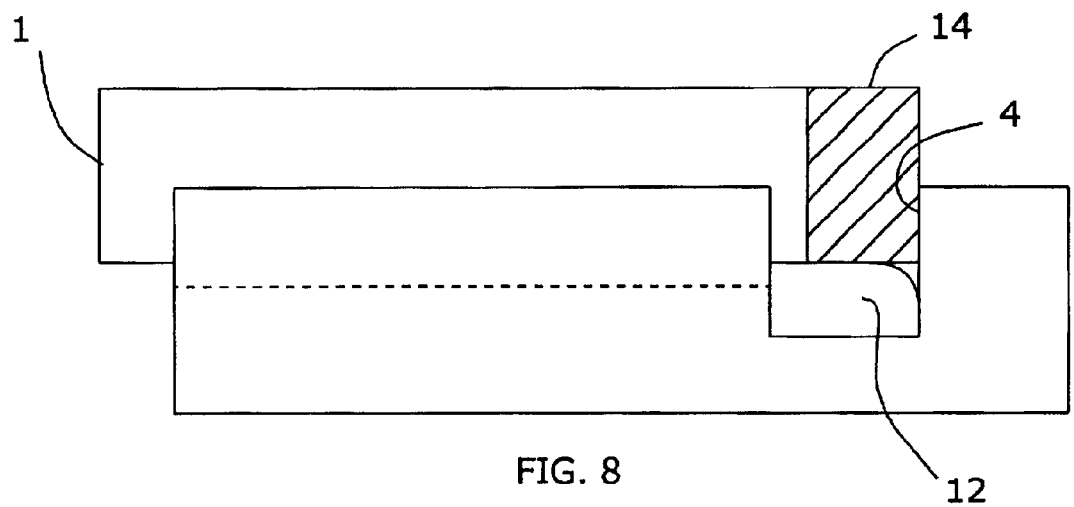
Figure 9:
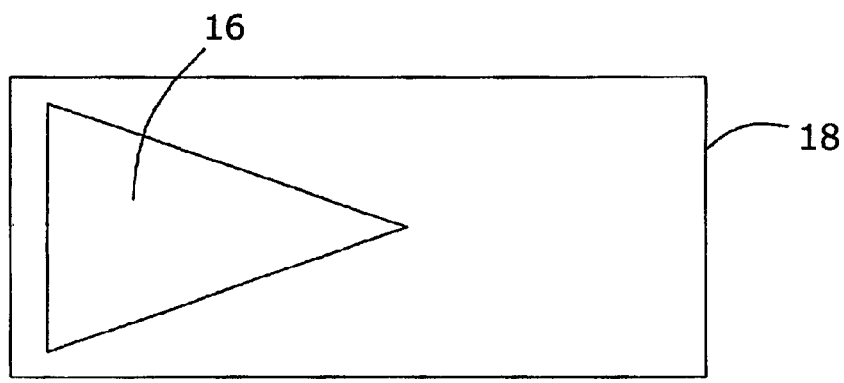
Figure 10:
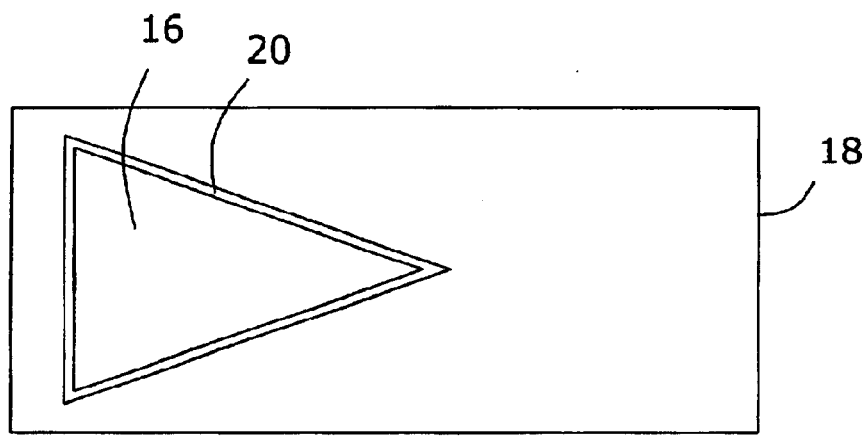
Figure 11:
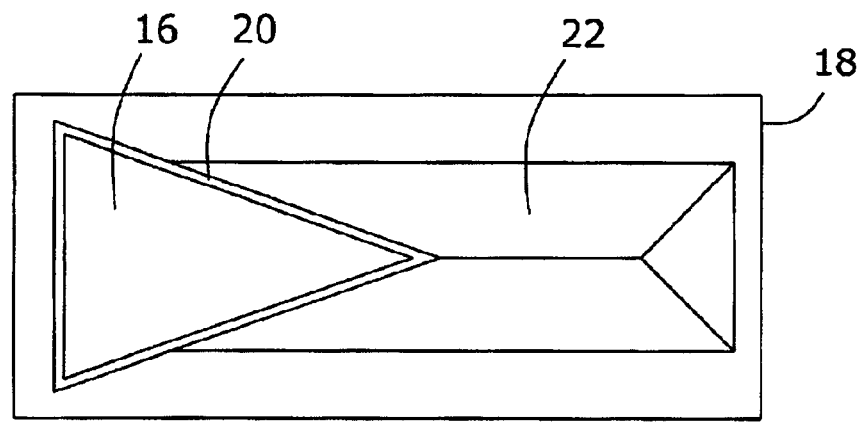
Figure 12:
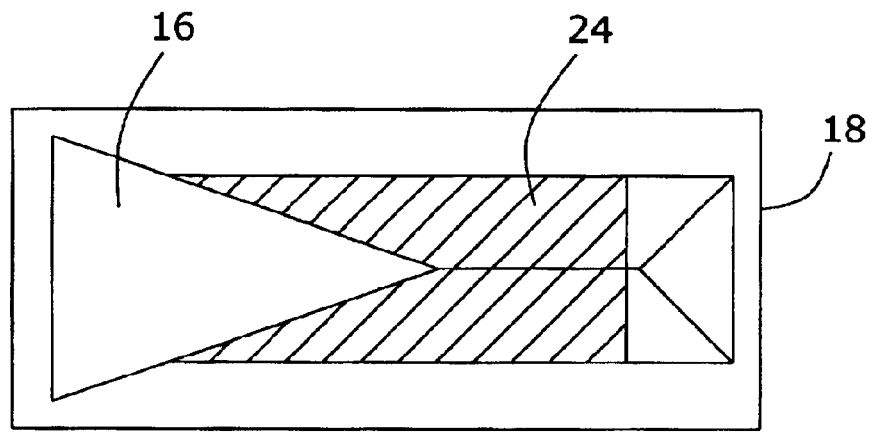

In another aspect of the invention, the liquid 12 (e.g. solder) is only present at the fiber stop 4, as shown in FIG. 8. Liquid 12 is not present in the V-groove 2. If solder is used as the liquid 2, the fiber 1 is only metallized (but for the face of the fiber) at the front end 14. The solder fillet 12 at the fiber stop 4 pulls the fiber 1 toward the fiber stop 4.

In a specific embodiment of the invention, tapered metallization areas can be made by dry etching of the substrate, following by oxidation and wet etching. The process is illustrated in FIGS. 9–12. A triangular pit 16 is dry etched in substrate 18. The dry etch can be a high-aspect ratio dry etch process, such as deep reactive ion etching. The pit 16 is conformally coated with a mask layer 20. The mask layer 20 can be a thermal oxidation layer or a silicon nitride CVD layer, for example. The mask layer 20 protects the sidewalls of the dry pit 16. The substrate 18 is masked and a wet etched V-groove 22 is formed. The dry pit 16 is deeper than the V-groove 22. The dry pit 16 has a triangular shape. The V-groove 22 is coated with metal, to form a tapered metallization pattern 24. Optionally, the coating in the dry pit 16 is removed. The dry pit 16 may also be coated with metal, but this will not substantially affect the surface tension forces on a fiber stub (not shown) in the V-groove 22, which in this case will force a fiber (not shown) to the right.

Optionally, a dicing saw cut (not shown) may be made distal to the dry pit 16, to provide a vertical fiber stop (not shown).

What is claimed is:

1. A fiber optic device, comprising:
a substrate comprising at least one groove comprising a first surface;
a fiber stop comprising a second surface;
a bonding material; and
at least one fiber comprising a third surface in the at least one groove, wherein at least one of the first surface, the second surface, and the third surface has a wettability that increases in the direction of the fiber stop, and wherein the increased wettability is obtained by the presence of tapered metallization on the first surface.

2. The fiber optic device of claim 1, wherein the bonding material is solder.

3. The fiber optic device of claim 1, further comprising a pit in the substrate, and wherein the pit is deeper than the groove.

4. The fiber optic device of claim 1, further comprising a pit with tapered sides in the substrate, and wherein the pit is deeper than the groove.

5. The fiber optic device of claim 1, wherein the at least one fiber is a fiber stub.

6. The fiber optic device of claim 1, wherein the at least one groove comprises a V-groove.

7. A fiber optic device, comprising:
a substrate comprising at least one groove comprising a first surface;
a fiber stop comprising a second surface;
a bonding material; and
at least one fiber comprising a third surface in the at least one groove, wherein at least one of the first surface, the second surface, and the third surface has a wettability that increases in the direction of the fiber stop, and wherein the increased wettability is obtained by the presence of metallization on the third surface, and wherein the second surface is metallized.

8. A fiber optic device, comprising:
a substrate comprising at least one groove comprising a first surface;
a fiber stop comprising a second surface;
a bonding material; and
at least one fiber comprising a third surface in the at least one groove, wherein at least one of the first surface, the second surface, and the third surface has a wettability that increases in the direction of the fiber stop, and wherein the increased wettability is obtained by the presence of selective metallization on the third surface, wherein the selective metallization is proximal to the fiber stop, and wherein the second surface is metallized.

9. A fiber optic device, comprising:
a substrate comprising at least one groove comprising a surface;
a fiber stop;
solder; and
tapered metallization on the surface, wherein the area of the metallization increases in the direction of the fiber stop.

10. A method for longitudinally locating an optical fiber comprising a stub end in a groove, comprising the steps of:
providing a substrate comprising at least one groove comprising a first surface;
providing a fiber stop comprising a second surface;
providing a bonding material; and
providing at least one fiber comprising a third surface in the at least one groove,
wherein at least one of the first surface, the second surface, and the third surface has a wettability that increases in the direction of the fiber stop, and wherein the increased wettability is obtained by the presence of tapered metallization on the first surface; and
pressing the optical fiber against the fiber stop by surface tension between the bonding material and at least one of the first surface, the second surface, and the third surface.

11. The method of claim 10, wherein the bonding material is solder.

12. The method of claim 10, further comprising a pit in the substrate, and wherein the pit is deeper than the groove.

13. The method of claim 10, further comprising a pit with tapered sides in the substrate, and wherein the pit is deeper than the groove.

14. The method of claim 10, wherein the at least one fiber is a fiber stub.

15. The method of claim 10, wherein the at least one groove comprises a V-groove.

16. A method for longitudinally locating an optical fiber comprising a stub end in a groove, comprising the steps of:
providing a substrate comprising at least one groove comprising a first surface;
providing a fiber stop comprising a second surface;
providing a bonding material; and
providing at least one fiber comprising a third surface in the at least one groove,
wherein at least one of the first surface, the second surface, and the third surface has a wettability that increases in the direction of the fiber stop, wherein the increased wettability is obtained by the presence of metallization on the third surface, and wherein the second surface is metallized; and
pressing the optical fiber against the fiber stop by surface tension between the bonding material and at least one of the first surface, the second surface, and the third surface.

17. A method for longitudinally locating an optical fiber comprising a stub end in a groove, comprising the steps of:
providing a substrate comprising at least one groove comprising a first surface;
providing a fiber stop comprising a second surface;
providing a bonding material; and
providing at least one fiber comprising a third surface in the at least one groove,
wherein at least one of the first surface, the second surface, and the third surface has a wettability that increases in the direction of the fiber stop, wherein the increased wettability is obtained by the presence of selective metallization on the third surface, wherein the selective metallization is proximal to the fiber stop, and wherein the second surface is metallized; and
pressing the optical fiber against the fiber stop by surface tension between the bonding material and at least one of the first surface, the second surface, and the third surface.

18. A method for locating an optical fiber comprising a stub end in a groove, comprising the steps of:
providing a substrate comprising at least one groove comprising a surface;

providing a fiber stop;

providing solder; and providing at least one fiber comprising a third surface in the at least one groove, wherein the surface comprises tapered metallization, and wherein the area of the metallization increases in the direction of the fiber stop; and pressing the optical fiber against the fiber stop by melting the solder.

19. The method of claim 18, wherein the at least one fiber is a fiber stub.

20. The method of claim 18, wherein the at least one groove comprises a V-groove.

* * * * *